United States Patent
Shahnazarian

[11] Patent Number: 6,158,188
[45] Date of Patent: Dec. 12, 2000

[54] HOLDOWNS

[75] Inventor: George Shahnazarian, Burnaby, Canada

[73] Assignee: MGA Construction Hardware & Steel Fabricating Ltd., Maple Ridge, Canada

[21] Appl. No.: 09/394,614

[22] Filed: Sep. 13, 1999

[51] Int. Cl.[7] ........................................ E04B 1/38
[52] U.S. Cl. .......................... 52/702; 52/295; 52/714; 403/190; 403/232.1
[58] Field of Search ........................ 52/263, 264, 293, 52/294, 293.3, 289, 296, 295, 702, 712, 714; 403/232.1, 190, 262

[56] References Cited

U.S. PATENT DOCUMENTS

| | | | |
|---|---|---|---|
| 4,527,933 | 7/1985 | Karhumaki et al. | 52/712 X |
| 4,665,672 | 5/1987 | Commins et al. | 52/295 |
| 4,717,279 | 1/1988 | Commins | 403/232.1 X |
| 4,744,192 | 5/1988 | Commins | 52/714 |
| 4,890,436 | 1/1990 | Colonias | 403/232.1 X |
| 5,092,097 | 3/1992 | Young | 52/705 |
| 5,249,404 | 10/1993 | Leek et al. | 403/232.1 |
| 5,380,116 | 1/1995 | Colonias | 403/232.1 |
| 5,410,854 | 5/1995 | Kimmell et al. | 52/712 |
| 5,467,570 | 11/1995 | Leek | 52/712 |
| 5,603,580 | 2/1997 | Leek et al. | 403/232.1 |
| 5,832,679 | 11/1998 | Roth | 52/714 X |
| 5,979,130 | 11/1999 | Gregg et al. | 52/295 |
| 5,987,828 | 11/1999 | Hardy | 52/295 |

FOREIGN PATENT DOCUMENTS

| | | |
|---|---|---|
| 2214944 | 4/1998 | Canada . |
| 2240569 | 12/1998 | Canada . |

*Primary Examiner*—Bruce A. Lev

[57] ABSTRACT

A holdown has a back with at least one first fastener opening in the back, a pair of mutually spaced side walls extending from the back and a seat extending from the side walls, the seat having mutually spaced, elongate, flat seat surface portions extending along and adjacent the side walls at substantially right angles to the plane of the back. A second fastener opening is formed in the seat midway between the side walls and the back, the side walls and the seat are being formed in one piece of sheet metal. A sheet metal clamp member having mutually-spaced, parallel opposite, flat edges, convex and concave major surfaces between the edges and a second fastener opening extending through the clamp member midway between the edges; is dimensioned for edge-to-edge surface seeking abutment of the edges with respective ones of the seat surface portions.

14 Claims, 16 Drawing Sheets

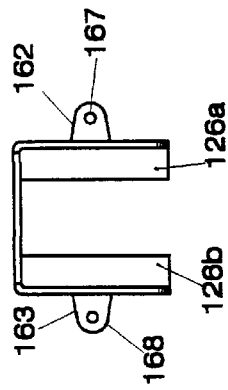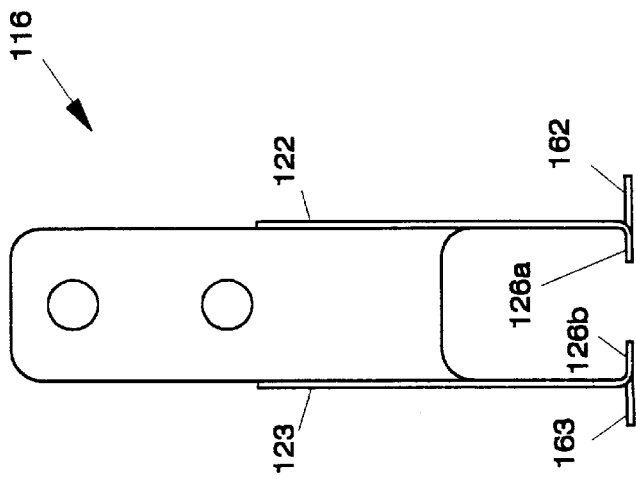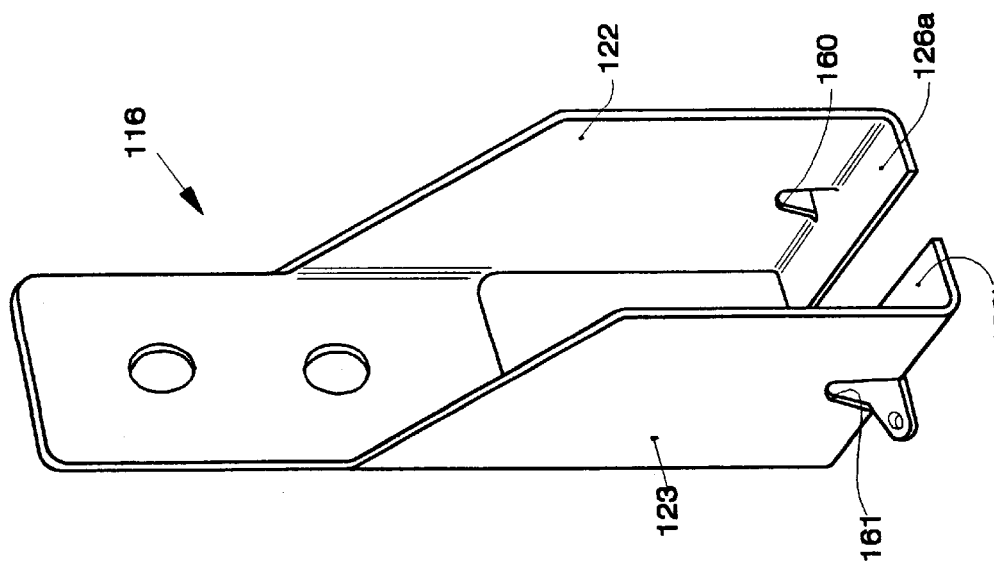

HOLDOWNS

BACKGROUND OF THE INVENTION

1. Field of the Invention

The present invention relates to holdowns for use, for example, in wood frame buildings to connect studs securely to cills or plates.

2. Description of the Related Art

To reinforce the walls of wood or metal frame buildings against racking strains caused, for example, by earthquakes or hurricanes, metal connectors known as "holdowns" are employed to connect studs in the frames to cills and/or plates.

More particularly, holdowns are known which comprise a pair of side walls extending parallel to one another and at right angles to a back, with a flat seat or base portion extending between the side walls at right angles to the side walls and to the back. The seat is formed with an opening through which a fastener, e.g in the form of an anchor bolt partially embedded in a concrete foundation, extends upwardly through a cill and the seat to an upper end, which is in threaded engagement with a nut tightened against the seat to hold the latter down against the cill. One or more fasteners, e.g. bolts or nails, extend through the back for securing the holdown to a stud.

It is found, in practice, that the seat of the holdown may be subject to distortion by forces acting vertically on the holdown and transmitted to the holdown from the stud through the back of the holdown, and it has therefore previously been proposed to counteract such distortion by the provision of a flat metal Washer between the nut and the seat, the washer being substantially coextensive with the seat and in face-to-face contact therewith.

Examples of such holdowns are disclosed in U.S. Pat. Nos. 4,744,192 issued May 17, 1988 to Alfred D. Cummins, 4,665,672 issued May 19, 1987 to Alfred D. Cummins et al., and 5,092,097 issued Mar. 3, 1992 to Donald E. Young.

In Canadian Patent Application No. 2,214,944 by Robert C. Gregg et al., laid open Apr. 10, 1998, there is disclosed a connector having a back, side walls and a seat member in which the seat member is concave and in which an N-shaped washer is seated on the seat member. The N-shape washer, more particularly, has convexly curved parallel edges which extend between and at right angles to the side wall, with opposed edge surfaces of the washer facing the surfaces of the side walls.

It is a disadvantage of this prior holdown that, because the seat member has a convexly curved undersurface, the seat member cannot be seated flush against an underlying cill. During installation of the holdown, it is not possible to place the holdown on the cill and to release it, before fastening it, because the holdown is not self-supporting on the cill.

BRIEF SUMMARY OF THE INVENTION

According to the present invention, there is provided a holdown having spaced side walls extending from a back, with a flat seat extending from the side walls, the seat having mutually spaced-elongate flat seat surface portions extending along and adjacent the side walls at substantially right angles to the plane of the back. A clamp member comprising sheet metal has mutually-spaced, parallel, flat opposite edges, with convex and concave major surfaces between the edges, and is dimensioned for edge-to-edge surface seating abutment of the edges with respective ones of the seat surface portions.

Therefore, by means of the present invention, the clamp member, in use, is pressed against the seat member along and adjacent the side walls and, consequently, braces the seat against distortion in use and, also, braces the side walls by clamping the seat surface portions adjacent and along the lengths of the side walls. The seat member, in a preferred embodiment of the invention, is a continuous, flat seat member extending between the side walls, but may alternatively be formed by overlapping flanges forming extensions of the side walls.

In the preferred embodiment of the invention, the clamp member is of arcuate cross-section and, preferably, of segmental cylindrical shape.

BRIEF DESCRIPTION OF THE DRAWINGS

The invention will be more readily understood from the following description of the preferred embodiments thereof given, by way of example, with reference to the accompanying drawings, in which:

FIGS. 3C through 3E show a view in perspective, a plan view and a view in front elevation, respectively, of a component of the holdown of FIGS. 3A and 3B;

DESCRIPTION OF THE PREFERRED EMBODIMENTS

Figure 1A:
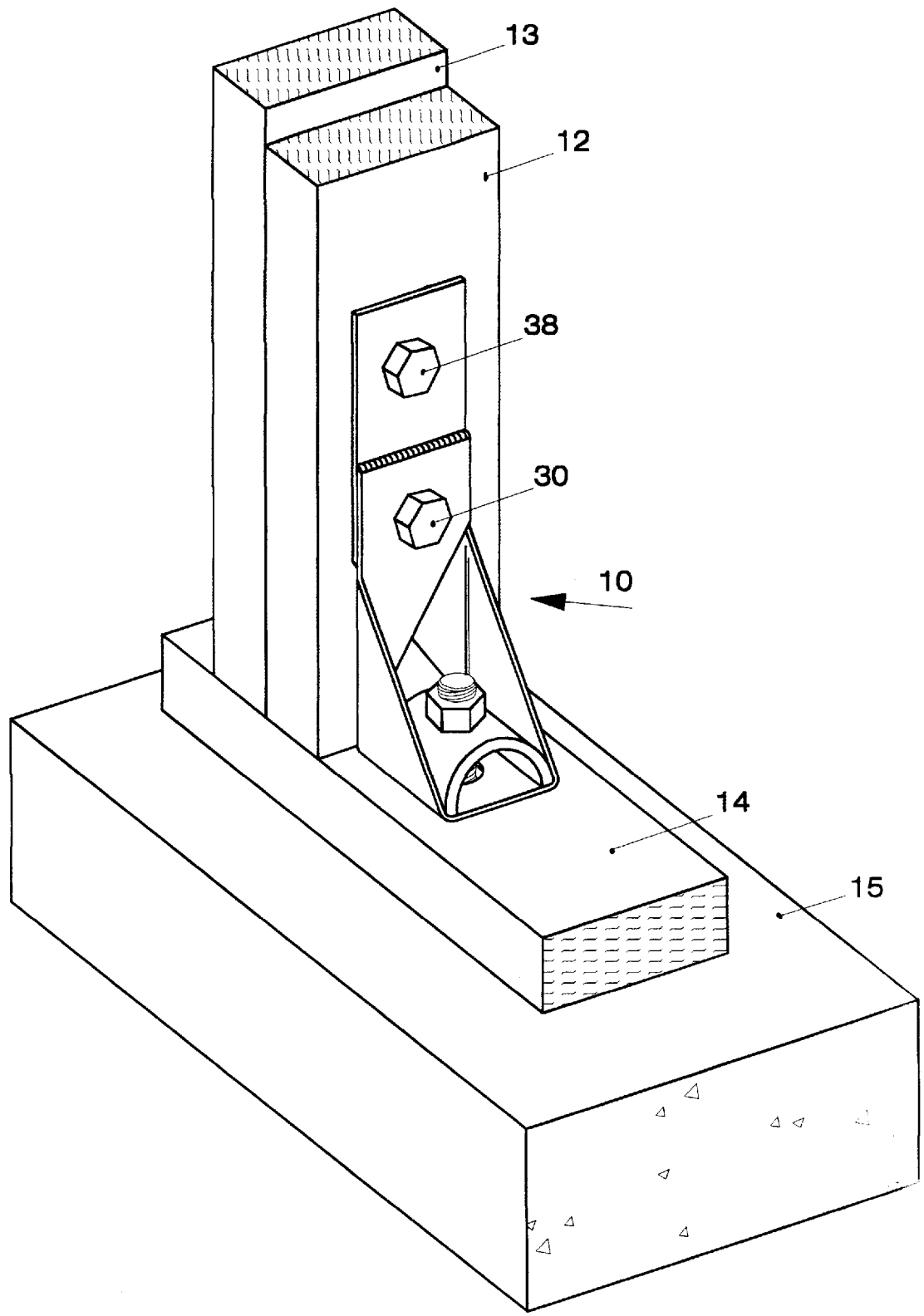
FIG. 1A shows a broken-away view, in perspective, of part of a wood frame building construction provided with a holdown according to a first embodiment of the present invention.

In FIG. 1A, there is shown a holdown indicated generally by reference numeral 10, which is used to provide a connection between studs 12 and 13 and a cill 14, which is provided on a cement foundation 15.

Figure 1B:
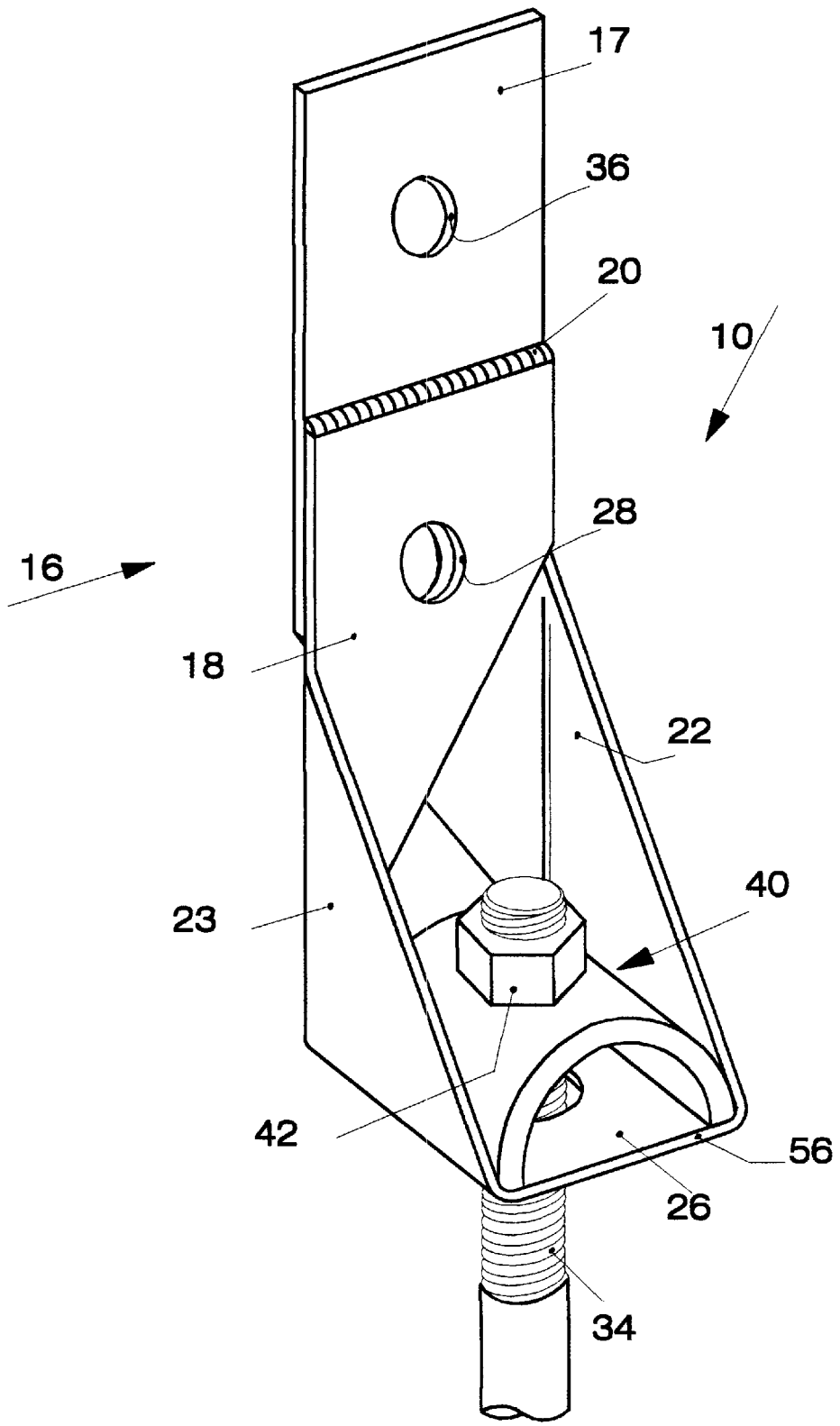
FIG. 1B shows a view in perspective of components of the holdown of FIG. 1A, with a broken-away anchor bolt.

Referring to FIGS. 1A and 1B, the holdown 10 has a back, indicated generally by reference numeral 16, which is formed by two back plates 17 and 18. The back plates 17 and 18 are disposed in face-to-face overlapping relationship and are connected together by a weld line 20 extending across the top of back plate 18.

Two side walls 22 and 23 extend at right angles to the back 16, and the back plate 17 and 18 form extensions of the side walls 22 and 23, respectively.

A flat, rectangular seat 26 extends between the side walls 22 and 23 and is disposed substantially at right angles to the side walls 22 and 23 and to the plane of the back 16. The back plate 17 and 18, the side walls 22 and 23 and the seat 26 are formed in one piece of sheet metal.

A fastener opening 28 is formed through the back plates 17 and 18 for receiving a bolt 30 for connecting the holdown 10 to the studs 12 and 13, and another fastener opening 36 extends through the back plate 17 for receiving a bolt 38, which also secures the holdown 10 to the studs 12 and 13. An elongate fastener opening 32 (FIG. 1C) is provided in the seat 26 for receiving an anchor bolt 34, one end of which is embedded in the concrete foundation 15.

Figure 2C:
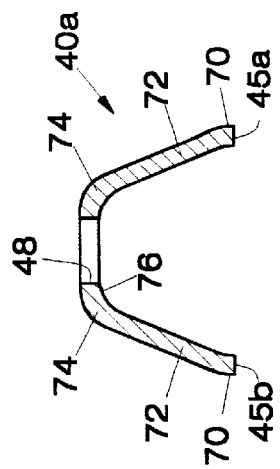
FIGS. 2C through 2F show views taken in transverse cross-section through modifications of the clamp member of FIGS. 2A and 2B.
Figure 2F:
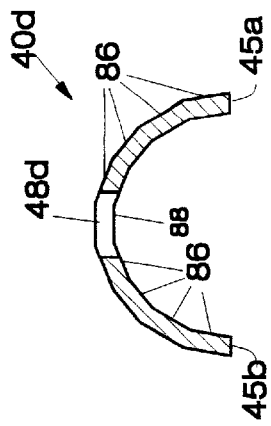
Figure 2B:
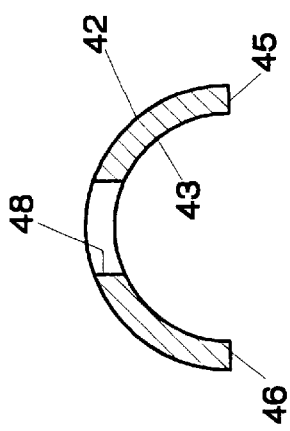
FIGS. 2A and 2B show views in perspective and in transverse cross-section, respectively, of a clamp member forming a part of the holdowns of FIGS. 1A through 1D.
Figure 2E:
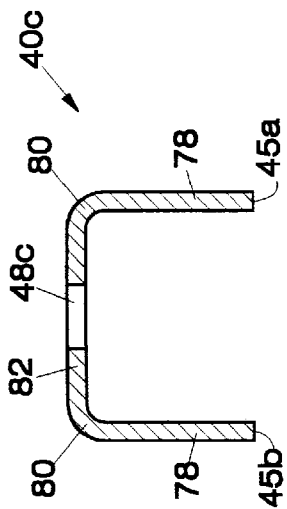
Figure 2A:
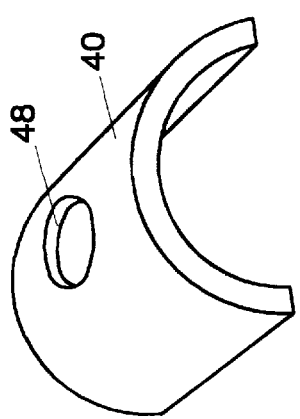

The anchor bolt 34 extends upwardly beyond the seat 26 through a clamp member indicated generally by reference numeral 40 in FIG. 1B, and illustrated in greater detail in FIGS. 2A and 2B. A nut 42 in threaded engagement with the upper end of the anchor bolt 34 secures the clamp member 40 in tight clamping engagement with the seat member 26.

Figure 1D:
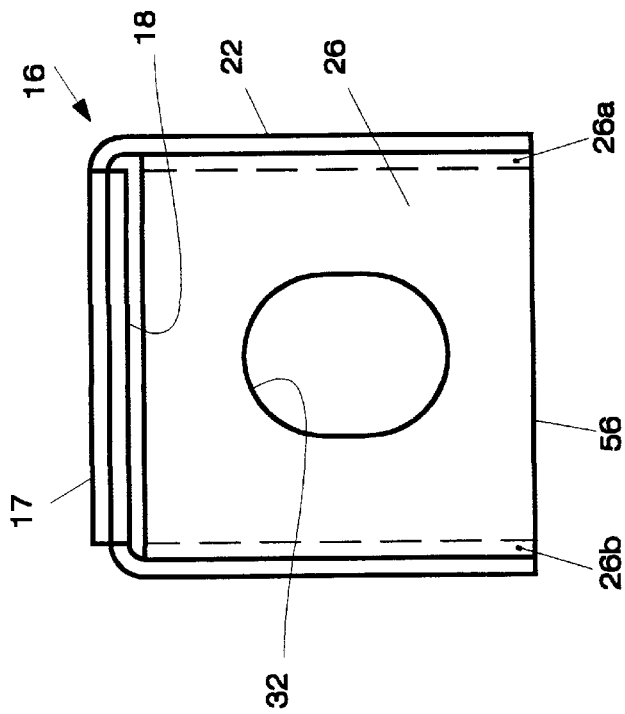
FIG. 1D shows a plan view of the component of FIG. 1C.

As shown in FIGS. 2A and 2B, the clamp member 40 is of arcuate cross-section, with a segmental-cylindrical shape, and has convex and concave segmental cylindrical major surfaces 42 and 43 extending between mutually spaced, parallel, flat, opposite edge surfaces 45 and 46. The clamp member 40 is also provided, midway between the edge surfaces 45 and 46, and also midway between opposite ends of the clamp member 40, with a circular fastener opening 48 for receiving the anchor bolt 34. The flat edge surfaces 45 and 46 are parallel and co-planar and, in use, are seated in abutment with corresponding surface portions 26a and 26b provided on the seat 26 and extending along the seat 26 adjacent and parallel to the side walls 22 from the back 16 to a front edge 56 of the seat. In FIG. 1D, the inner limits of these surface portions 26a and 26b are indicated by broken lines.

Figure 1C:
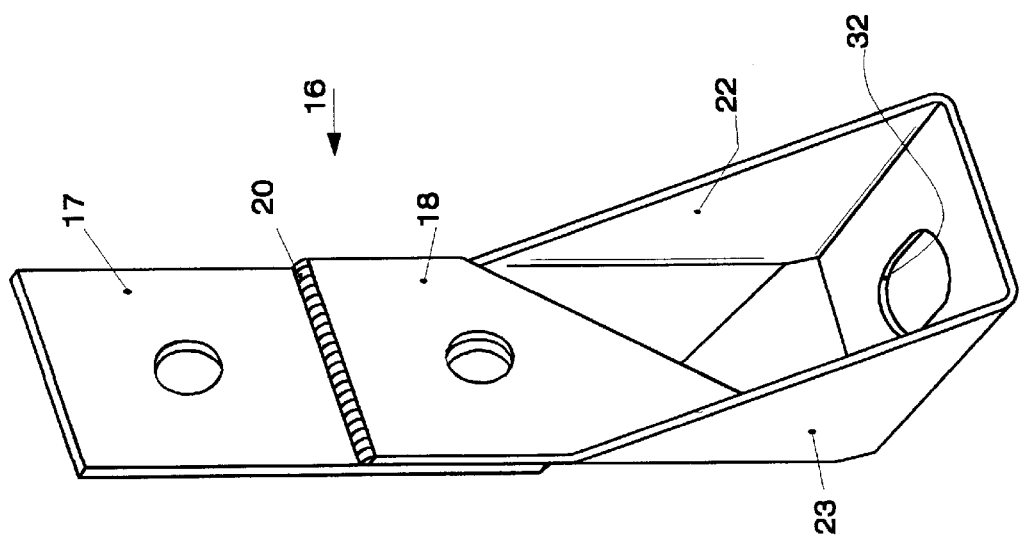
FIG. 1C shows a view corresponding to that of FIG. 1B but of only one of the components of the holdown.

As can be seen from FIGS. 1C and 1D, in the present embodiment of the holdown, the seat 26 extends continuously between the side walls 22 and 23.

Figure 1E:
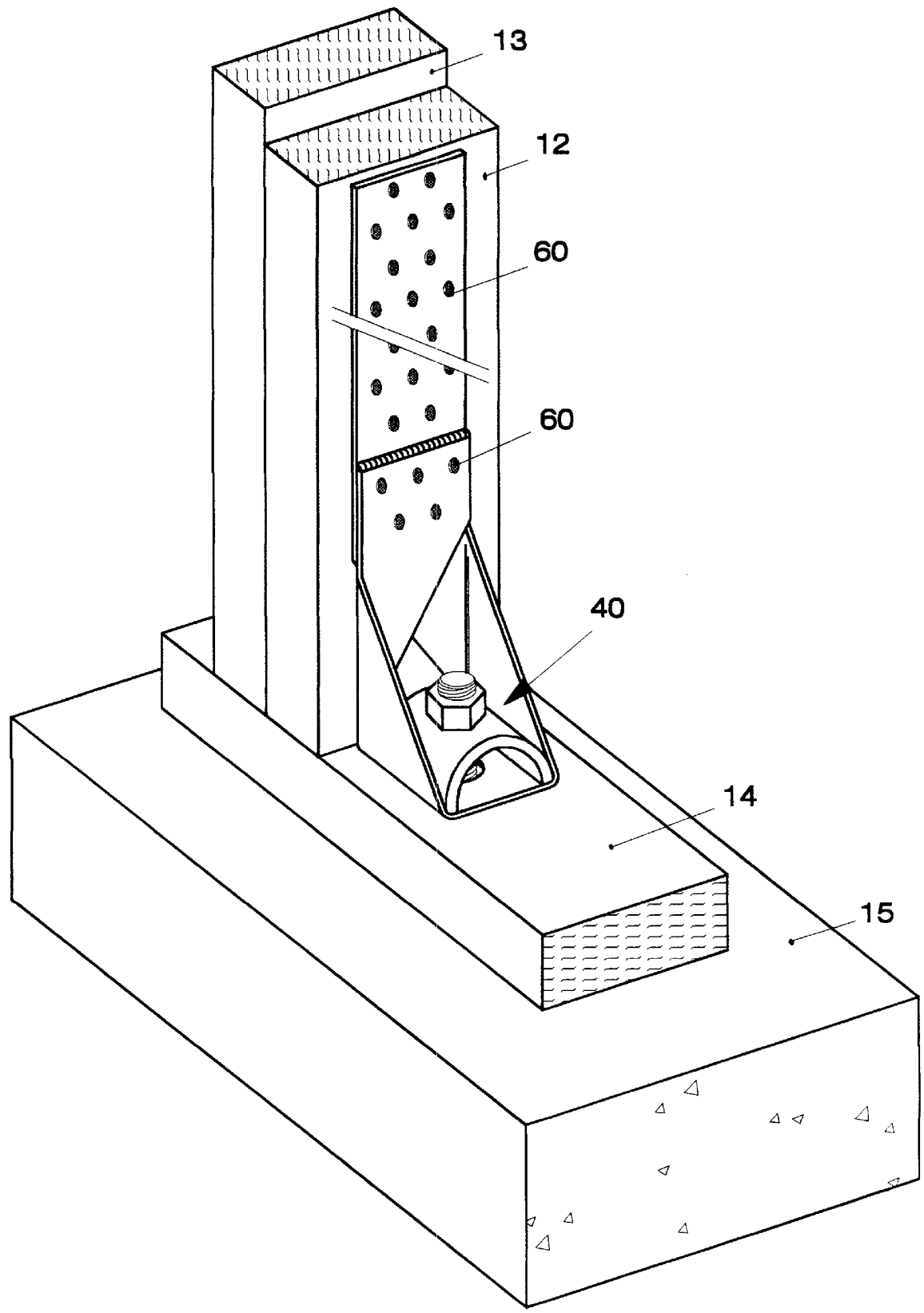
FIG. 1E shows a view corresponding to that of FIG. 1A but illustrating a first modification of the holdown of FIGS. 1A through 1D.
Figure 1F:
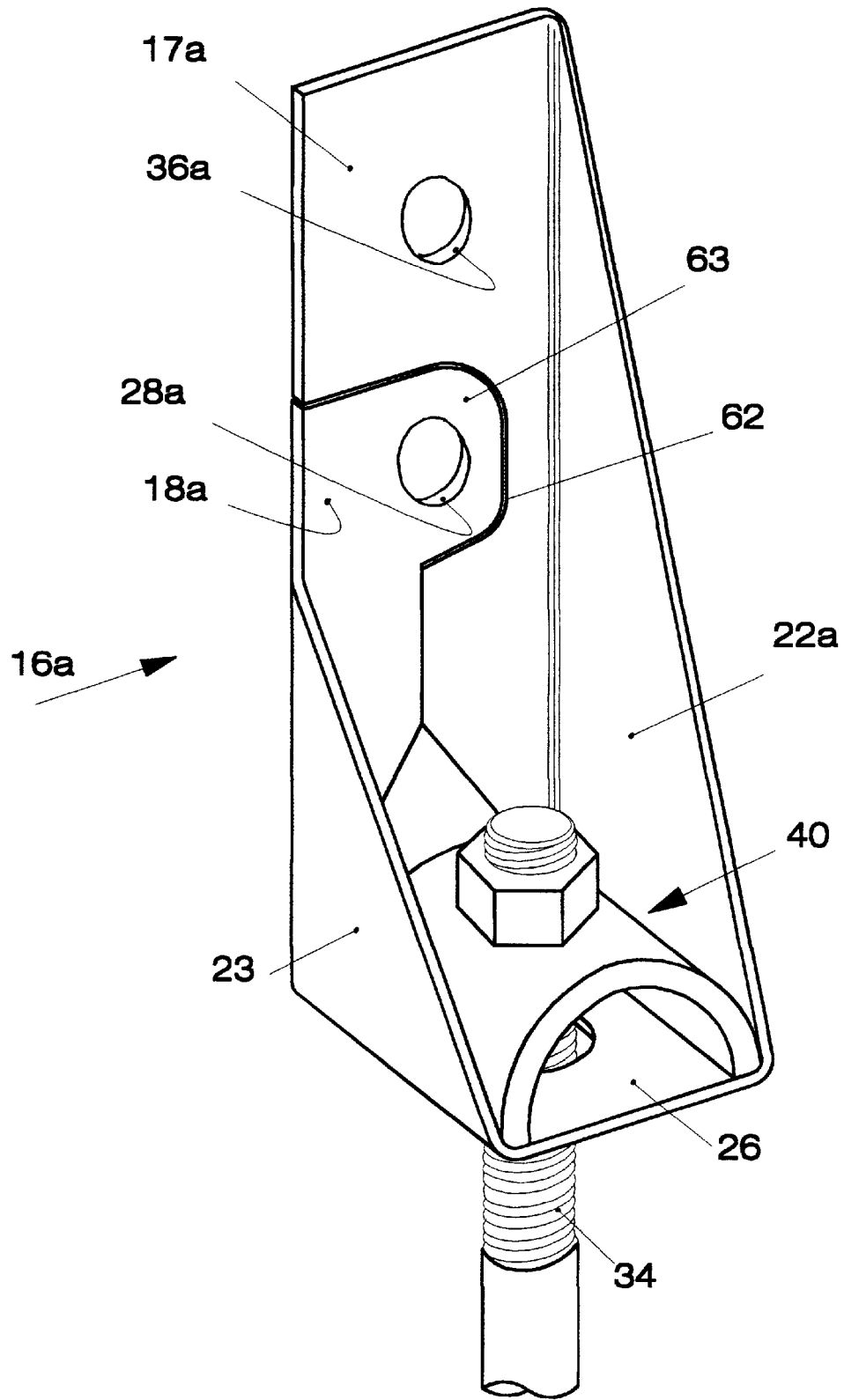
FIG. 1F shows a view corresponding to that of FIG. 1B but illustrating another modification of the holdown of FIGS. 1A through 1D.

FIG. 1E shows a modification of the holdown 10 in which the openings 28 and 36 in the back 16 are replaced by a plurality of nail holes 60 to enable the back 16 to be secured to the studs 12 and 13 by nails (not shown) instead of by the bolts 30 and 38 shown in FIG. 1A. FIG. 1F shows another modification of the holdown 10, in which the back, which in this case is indicated generally by reference numeral 16a, is formed of two back plates or portions 17a and 18a which, instead of overlapping one another, are located side by side. The plate 17a is formed with a lateral recess 62, which receives a lateral projection 63 on the back plate 18a, and a circular bolt opening 28a is formed in the projection 63, while a circular bolt hole 36a is provided in the back plate 17a.

Also, the holdown shown in FIG. 1F has a side wall 22a which extends to the top of the back plate 17a.

Figure 1G:
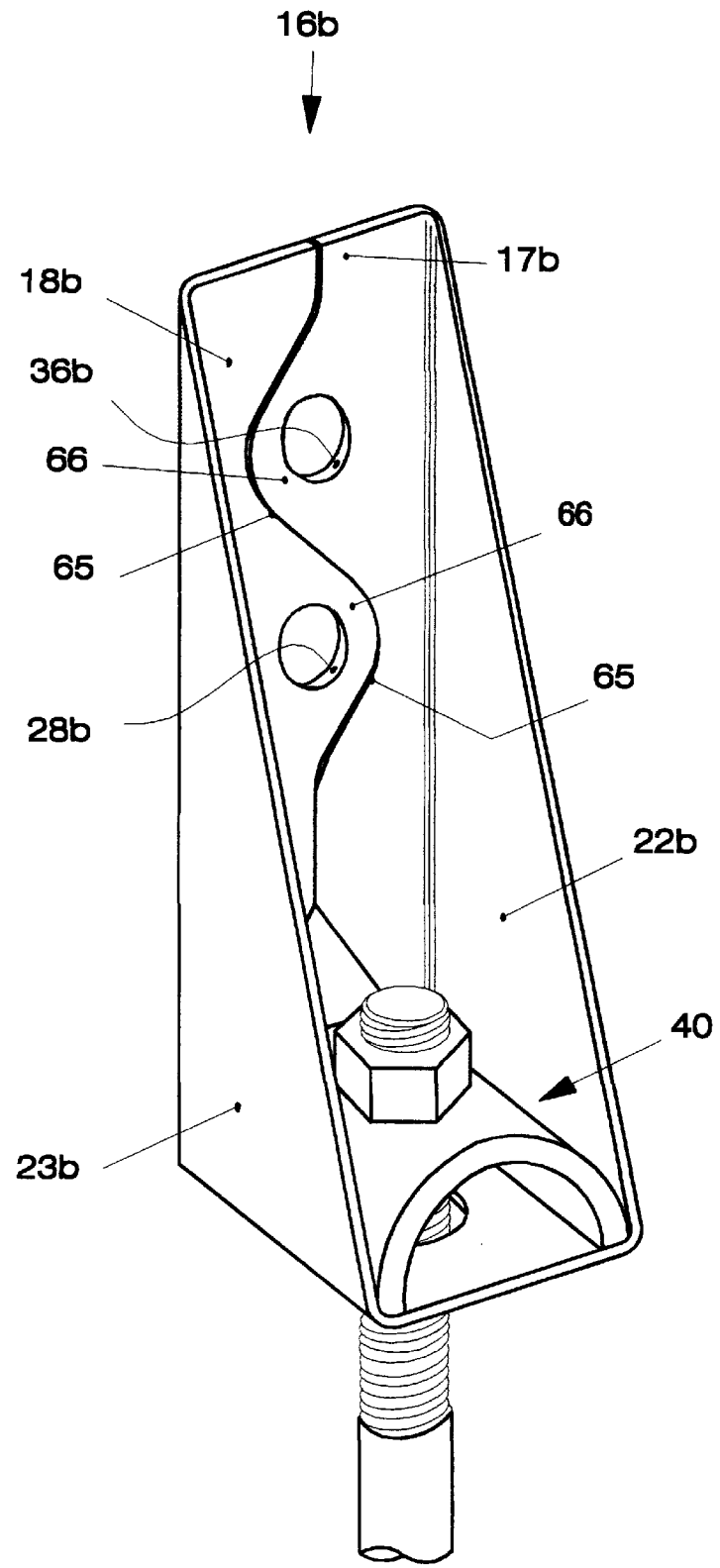
FIG. 1G also shows a view corresponding to that of FIG. 1B but illustrating yet another modification of the holdown of FIGS. 1A through 1D.

In the further modification of the holdown 10 shown in FIG. 1G, the back, which in this case is indicated generally by reference numeral 16b, is formed by two back plates 17b and 18b, and the back plates 17b and 18b are each formed with a lateral recess 65 receiving a lateral projection 66 on the other of these back plates, with circular bolt holes 28b and 36b being formed in the lateral projections 66.

Also, the holdown shown in FIG. 1G has side walls 22b and 23b which extend to the tops of their respective back plates 17b and 18b.

Otherwise, the parts of the holdowns shown in FIGS. 1D through 1G are similar to the corresponding parts of the holdown 10 of FIGS. 1A through 1C and, for convenience, are therefore indicated by the same reference numerals and are not further described. FIGS. 2C through 2F show views in transverse cross-section through four possible modifications of the clamp member 40, indicated generally by reference numerals 40a through 40d, respectively.

Each of the clamp members 40a through 40d has a pair of flat, co-planar edge surfaces 45a and 46a, corresponding to the edge surfaces 45 and 46 of the clamp member 40 and likewise dimensioned for seating abutment on the seat surface portions 26a and 26b.

The clamp member 40a of FIG. 2C has parallel, vertical edge surfaces 45a and 45b extending from the edge surface 45a and 45b and merging with flat inclined side walls 72, which are convergent and which merge through curved corner portions 74 with a flat top 76, in which there is formed a circular bolt hole 48a corresponding to the bolt hole 48 of the clamp member 40.

Figure 2D:
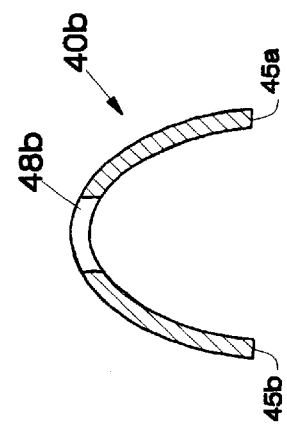

The clamp member 40b of FIG. 2D has a parabolically arch-shaped cross-section, formed with a central, circular bolt hole 48b.

The clamp member 40c of FIG. 2E has flat, parallel, opposite side walls 78 extending from the edge surfaces 45a and 45b and merging through curved corner portions 80 with a flat top 82, which is formed with a central, circular bolt hole 48c.

The clamp member 40d of FIG. 2F is arch-shaped with, at each side, four flat wall portions 86 and with a flat top 88 and is provided with a central, circular bolt hole 48d.

Figure 3B:
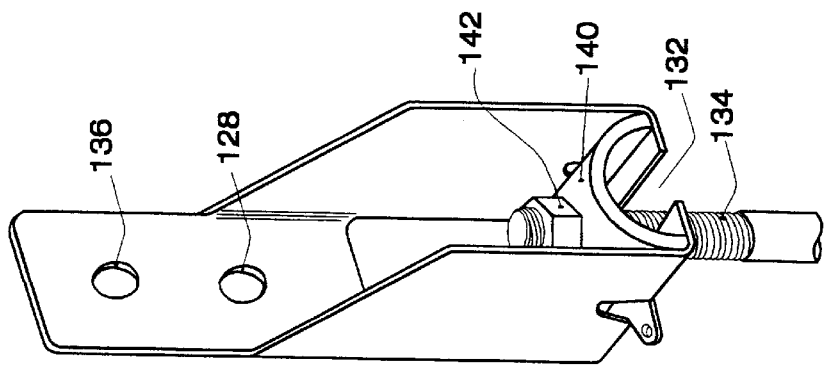
FIG. 3B shows a view in perspective of the holdown of FIG. 3A.
Figure 3A:
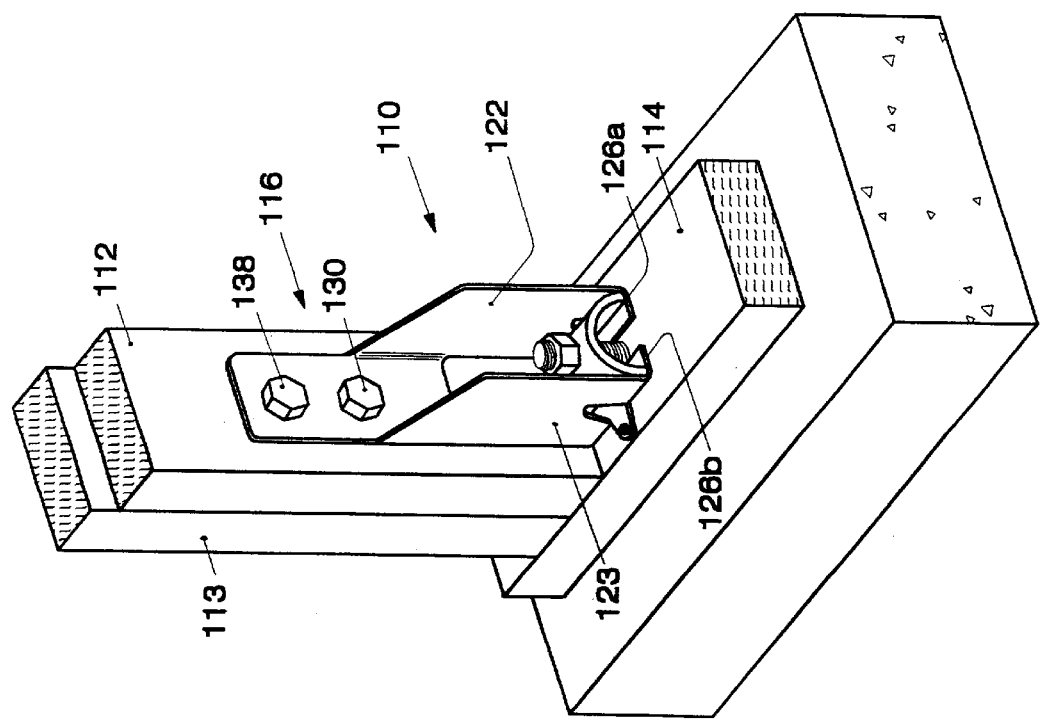
FIG. 3A shows a view corresponding to that of FIG. 1A but illustrating a further modification of the holdown of FIGS. 1A through 1C.

In FIG. 3A, in which parts corresponding to those of FIGS. 1A through 1C are, for convenience, indicated by corresponding reference numerals, increased by 100, there is shown a holdown indicated generally by reference numeral 110, which has a back indicated generally by reference numeral 116 secured by bolts 130 and 138, which extend through fastener openings 128 and 136 in the back 116 and through studs 112 and 113. The holdown 110 has side walls 122 and 123, extending at right angles to the back 116, and a seat formed by two separate seat portions 126a and 126b which are separated from one another by a gap 132 forming an opening for the anchor blot 134, the seat portions 126a and 126b being inturned extensions of the side walls 122 and 123.

The holdown 110 also includes a clamp member 140, which is identical to the clamp member 40 of FIGS. 2A and 2B, but which may for example be modified in accordance with any of FIGS. 2C through 2F, and which therefore will not be described in further detail.

The seat portions 126a and 126b are formed with upper surfaces forming seat surface portions, against which the edge surfaces of the clamp member 140, corresponding to the edge surfaces 45 and 46 of the clamp member 40, are seated in surface-to-surface clamping abutment under a pressure maintained by a nut 142 on the anchor bolt 134.

The back 116 is formed by a single thickness of the sheet metal, from which the back 116, the side walls 122 and 123 and the seat portions 126a and 126b are formed in one piece.

The side walls 122 and 123 are formed with cut-outs 160 and 161, which form retainer tabs 162 and 163 projecting laterally upwardly of the holdown 110 from the side walls 122 and 123. The seat portions 126a and 126b are coplanar with one another and with the retainer tabs 162 and 163, as can be clearly seen from FIG. 3E. When the holdown is in use, as shown in FIG. 3A, the retainer tabs 162 and 163 are secured to a cill 114 by nails inserted through nail holes 167 and 168 in the retainer tabs 162 and 163.

Figure 4B:
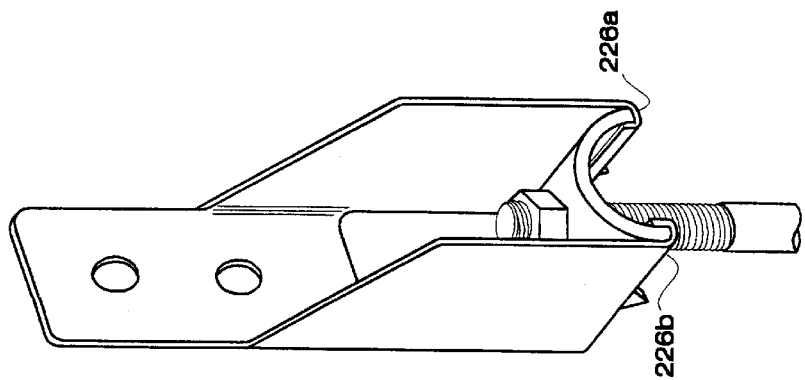
FIG. 4B shows a view in perspective of the holdown of FIG. 4A, provided with a broken-away anchor bolt.
Figure 4A:
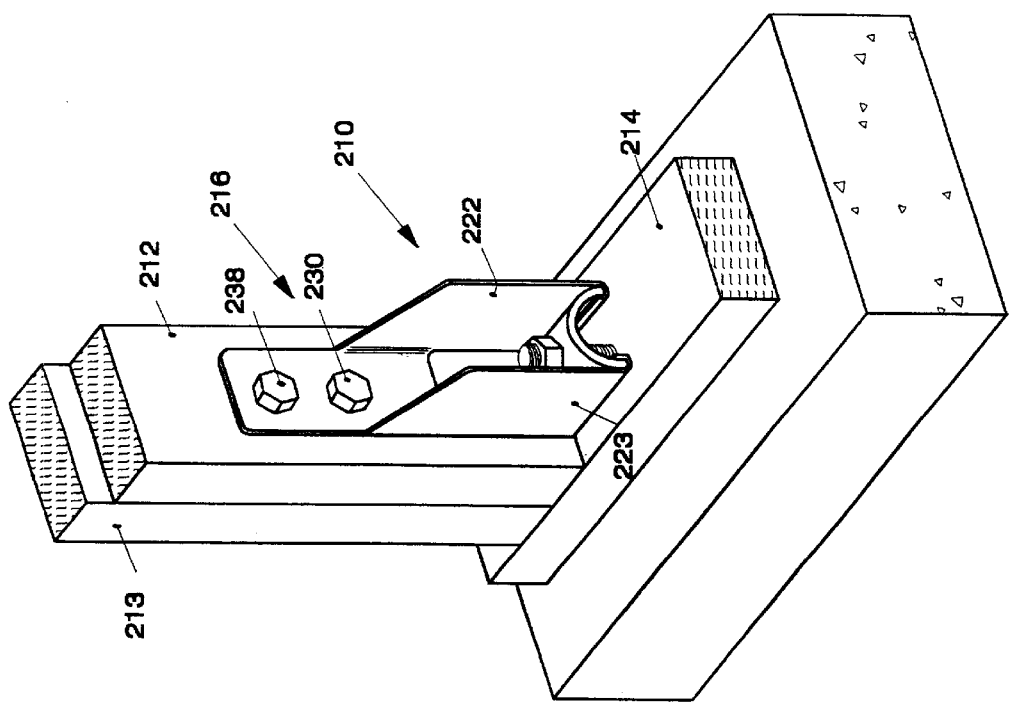
FIG. 4A shows a view corresponding to that of FIG. 1A but illustrating a further embodiment of the holdown.

In FIG. 4A there is shown further modification of the holdown according to the present invention, in which parts which correspond to those of FIG. 1A through 1C are, for convenience, indicated by the same reference numerals increased by 200.

More particularly, FIG. 4A shows a holdown 210 having a back indicated generally by reference numeral 216, which is secured by bolts 230 and 238 to studs 212 and 213.

The holdown 210 includes opposite side walls 222 and 223, which extend at right angles to the back 216, and a seat comprising two seat portions 226a and 226b.

Figure 4D:
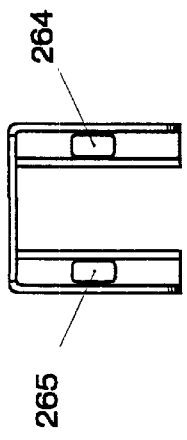
FIGS. 4C through 4E shows a view in perspective, a plan view and a view in front elevation, respectively, of a component of the holdown of FIGS. 4A and 4B.
Figure 4E:
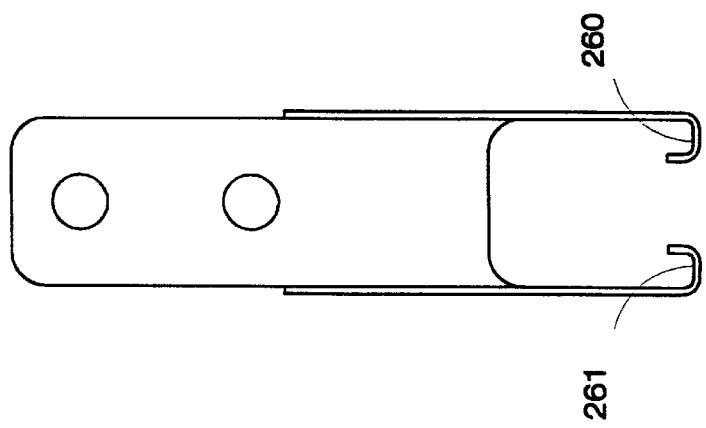
Figure 4C:
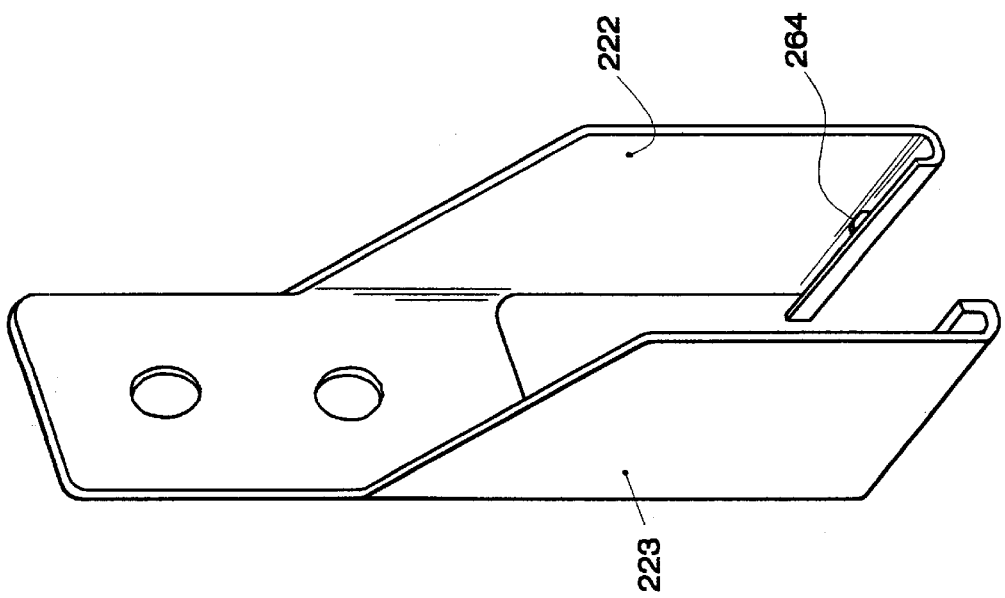
Figure 5B:
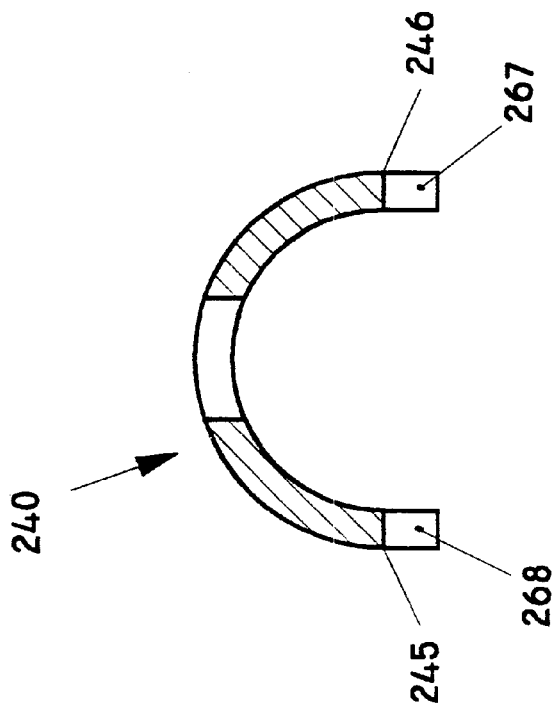
FIGS. 5A and 5B show views in perspective and in transverse cross-section of a clamp member forming part of the holdown of FIG. 4A.
Figure 5A:
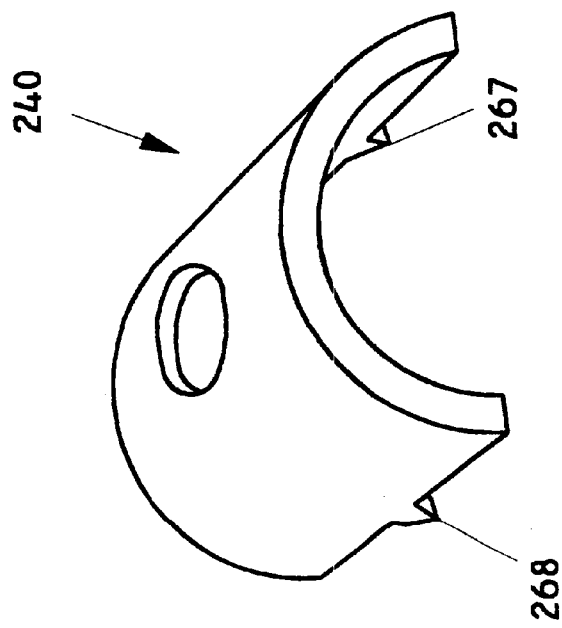

As can be seen from FIGS. 4C through 4E, the seat portions 226A and 226b, together with the lower ends of the side walls 222 and 223, form upwardly-open elongate channel or gutter-shaped recesses 260 and 261, which receive the opposite edges of a segmental, cylindrical clamp member 240. More particularly, the recesses 260 and 261 include seat surface portions on the seat portions 226a and 226b which, in use, are in surface-to-surface contact with edge surfaces 245 and 246 of the clamp member.

The seat portions 226a and 226b are also formed, midway along the recesses 260 and 261, with retainer openings 264 and 265, and the edge surfaces 245 and 246 of the clamp member 240 are formed with retainer spikes 267 and 268, which extend through the retainer openings 264 and 265 and project beyond the seat portions 226a and 226b so as to penetrate the wood of the cill 214 and, thereby, further secure the holdown 210 relative to the cill 214.

Figure 6A:
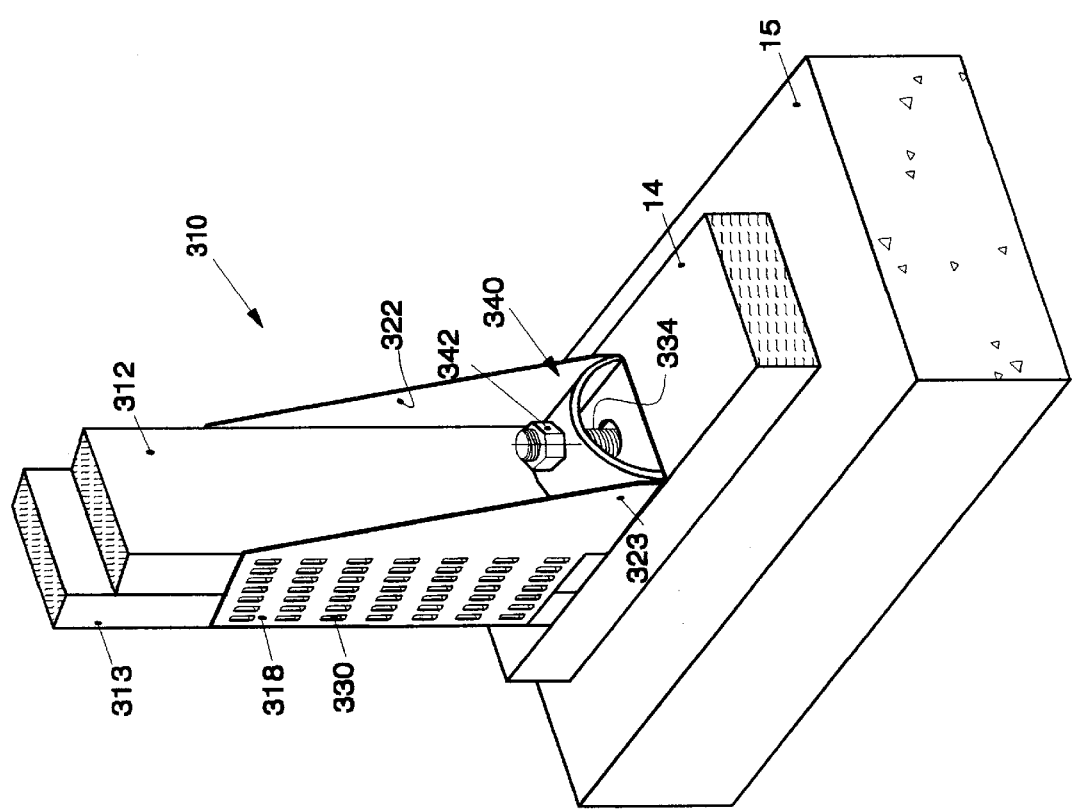
FIG. 6A shows a view corresponding to that of FIG. 1A but illustrating a still further embodiment of the holdown.
Figure 6B:
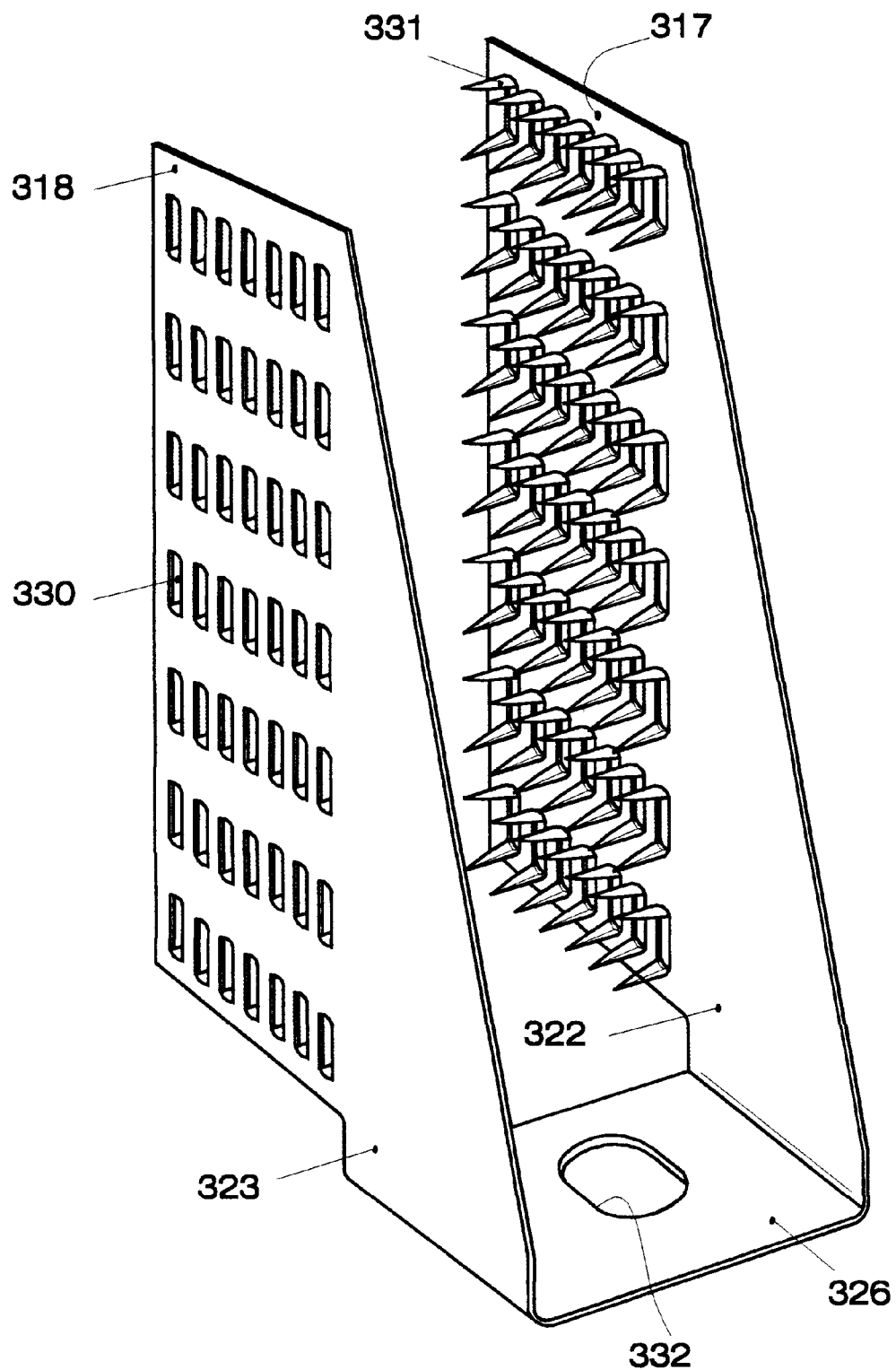
FIG. 6B shows a view in perspective of a part of the holdown of FIG. 6A.

In FIGS. 6A and 6B there is illustrated a still further embodiment of the holdown according to the present invention, which is indicated generally by reference numeral 310.

The holdown 310 has side walls 322 and 323, which have rear extensions 317 and 318, and a seat 326 extending between the side walls 322 and 323. The rear extensions 317, 318, the side walls 322 and 323 and the seat 326 are formed in one piece of sheet metal.

In this embodiment of the invention, the rear extensions 317 and 318 are formed with cut-outs 330, which provide connector spikes 331 for connecting the holdown 310 to wooden studs 312 and 313.

The holdown 310 also includes a segmental cylindrical clamp member 340, which is similar to the clamp member 40 of FIGS. 1A through 1C and which, therefore, will not be described in greater detail. As will be apparent from the description of the preceding embodiments of the invention, the clamp member 340 has edge surfaces in surface-to-surface abutment with seat surface portions extending along the seat 326 adjacent the side walls 322 and 323, and the clamp member 340 is clamped against the seat 326 by a nut 342 on an anchor bolt 334. In this embodiment the seat 326 extends continuously between the side walls 322 and 323. The seat 326 is formed with an elongate bolt hole 332 for receiving the anchor bolt 334.

Figure 7A:
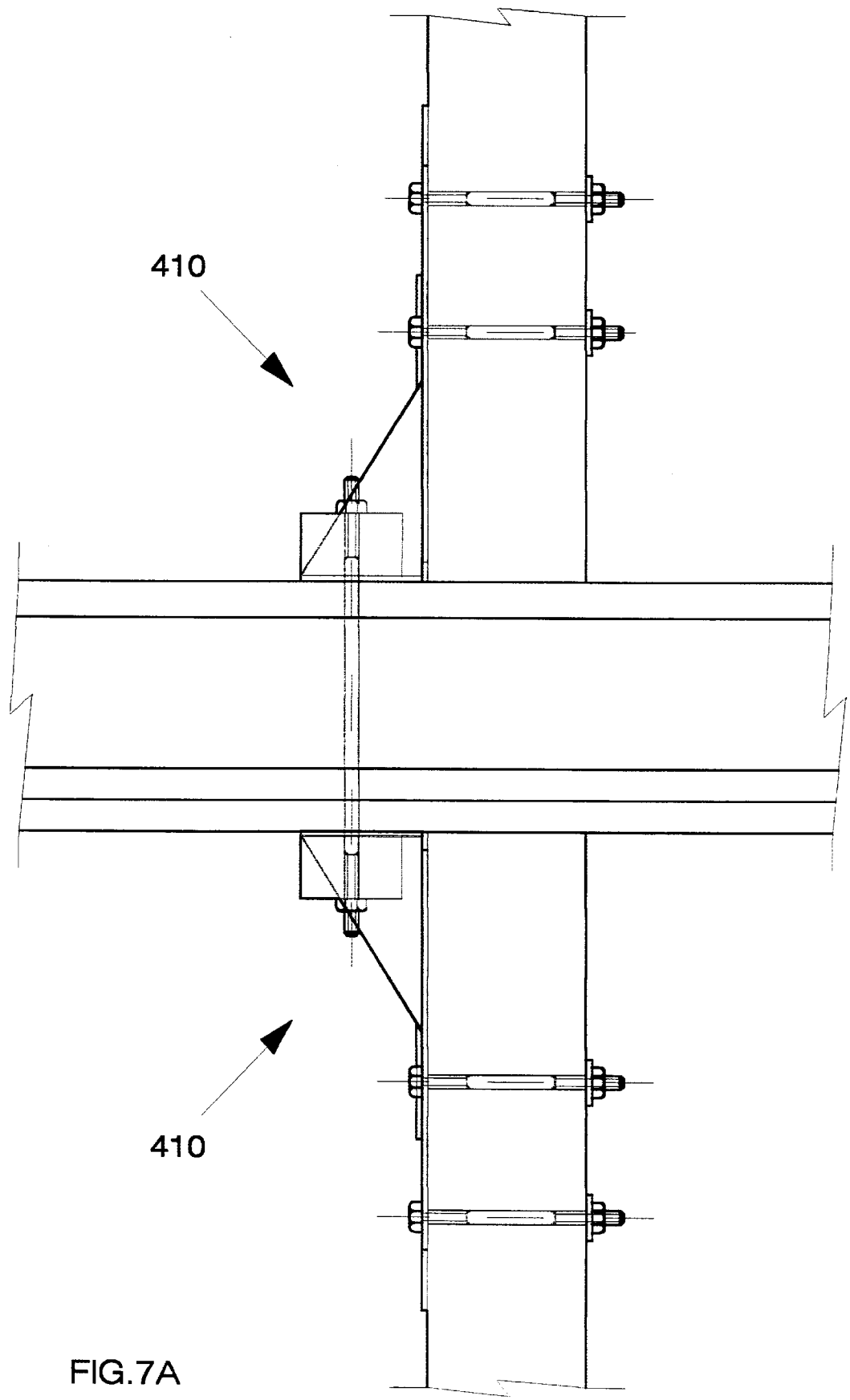
FIGS. 7A and 7B show, respectively, a plan view and a view in perspective of a joist connections employing holdowns such as that shown in FIG. 1A.
Figure 7B:
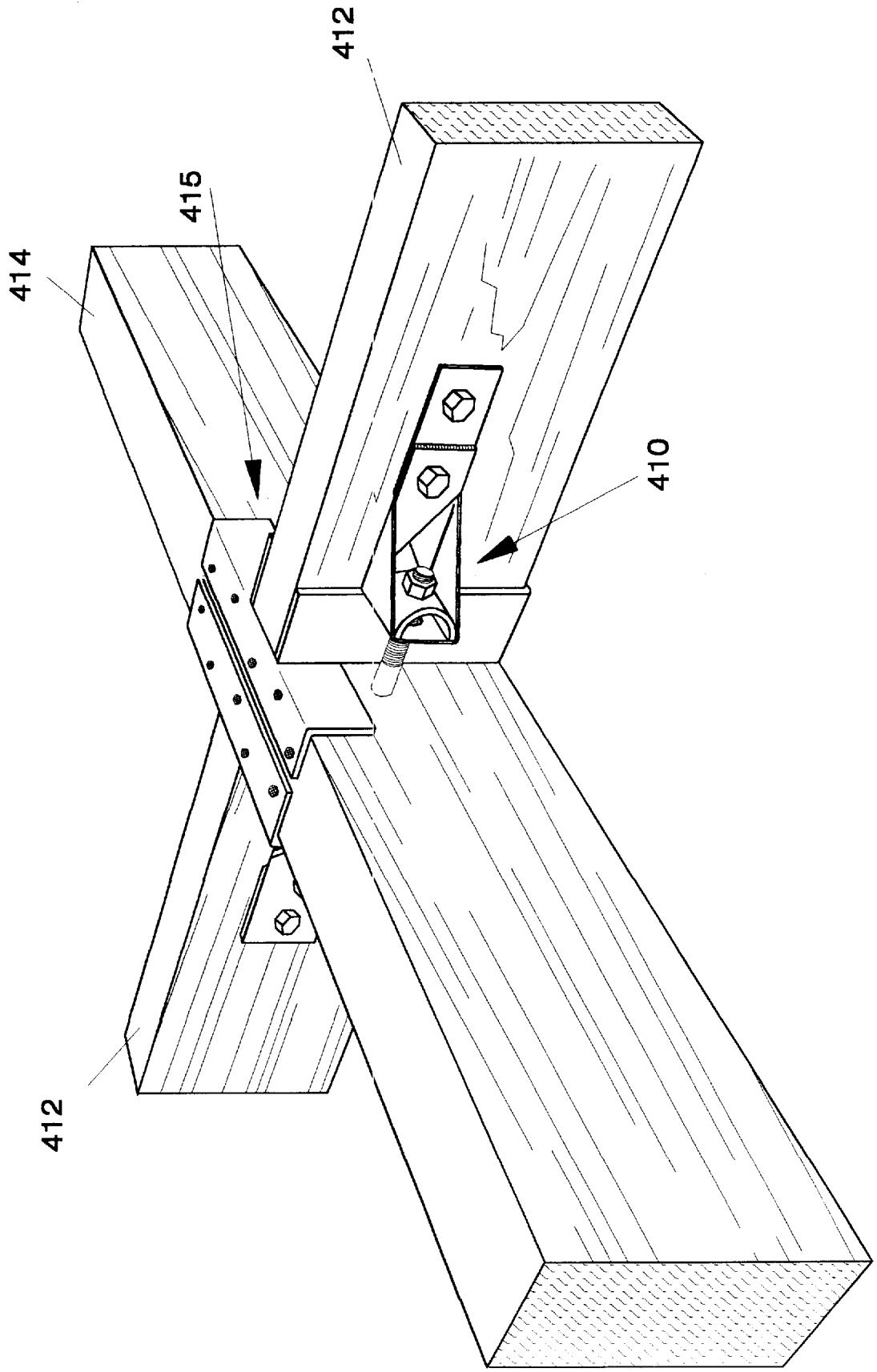

FIGS. 7A and 7B show a pair of holdowns, which are indicated generally reference numerals 410 and which are similar to the holdown 10 of FIG. 1, in use for securing a pair of beams 412 to a joist. The beams 412 are also connected to the joist by metal connectors indicated generally by reference numerals 415, which are known in the art and which, since they do not form part of the present invention, are not further described herein.

As will be apparent to those skilled in the art, various further modifications may be made within the scope of the appended claims. Also, the present invention is not restricted to use for connecting wood members together but may, for example, be employed for connecting metal components, for example steel studs and cills.

What is claimed is:

1. A holdown, comprising:
   a back;
   at least one first fastener opening in said back;
   a pair of side walls extending from said back, said side walls being spaced from one another;
   a flat seat between said side walls;
   said seat having elongate, flat seat surface portions extending along said seat adjacent and parallel to said side walls;
   a second fastener opening in said seat midway between said side walls;
   said back, said side walls and said seat being formed in one piece of sheet metal;
   a clamp member;
   a clamp member comprising sheet metal and having parallel, flat opposite edge surfaces, convex and concave major surfaces between said edges and a second fastener opening extending through said clamp member midway between said edges; and
   said clamp member being dimensioned for edge-to-edge surface seating abutment of said edges with respective ones of said seat surface portions.

2. A holdown as claimed in claim 1, wherein said clamp member has an arcuate cross-section.

3. A holdown as claimed in claim 1, wherein said convex and concave major surfaces of said clamp member are segmental cylindrical surfaces.

4. A holdown as claimed in claim 1, in which said seat extends continuously from one to the other of said side walls and wherein said back, said side walls and said seat are in one piece.

5. A holdown as claimed in claim 1, wherein said seat is in two separate seat portions extending from said side walls, respectively, said seat surface portions being formed on respective ones of said seat portions and said first fastener opening forms a gap separating said seat portions.

6. A holdown as claimed in claim 5, wherein adjacent said seat portions, said side walls are provided with cut-outs and said cut-outs form nailing tabs projecting laterally outwardly of said holdown.

7. A holdown as claimed in claim 6, wherein said seat portions are flat and coplanar with one another and with said nailing tabs.

8. A holdown as claimed in claim 5, wherein said seat portions form, with said side walls, elongate recesses of U-shaped cross-section for receiving said edges of said clamp member.

9. A holdown as claimed in claim 8, wherein retainer openings are formed in said seat portions and said edges of said clamp member are formed with retainer spikes dimensioned to extend through said retainer openings and to project beyond said seat portions.

10. A holdown as claimed in claim 9, wherein said seat extends continuously between and in one piece between said side walls.

11. A holdown, comprising:

a pair of side walls, said side walls being spaced from one another;

a flat seat between said side walls;

said seat having elongate, flat seat surface portions extending along said seat adjacent and parallel to said side walls;

a first fastener opening in said seat midway between said side walls;

said side walls and said seat being formed in one piece of sheet metal;

a clamp member;

said clamp member comprising sheet metal and having parallel, flat opposite edge surfaces, convex and concave major surfaces between said edges and a second fastener opening extending through said clamp member midway between said edges; and said clamp member being dimensioned for edge-to-edge surface seating abutment of said edges with respective ones of said seat surface portions; and a pair of side wall extensions coplanar with respective ones of said side walls and each being formed with a plurality of cut-out connector spikes.

12. A holdown as claimed in claim 11, wherein said clamp member has an arcuate cross-section.

13. A holdown as claimed in claim 11, wherein said convex and concave major surfaces of said clamp member are segmental cylindrical surfaces.

14. A holdown as claimed in claim 11, in which said seat extends continuously from one to the other of said side walls and wherein said side walls and said seat are in one piece.

* * * * *